INVENTOR.
Robert L. Winkler

INVENTOR.
Robert L. Winkler

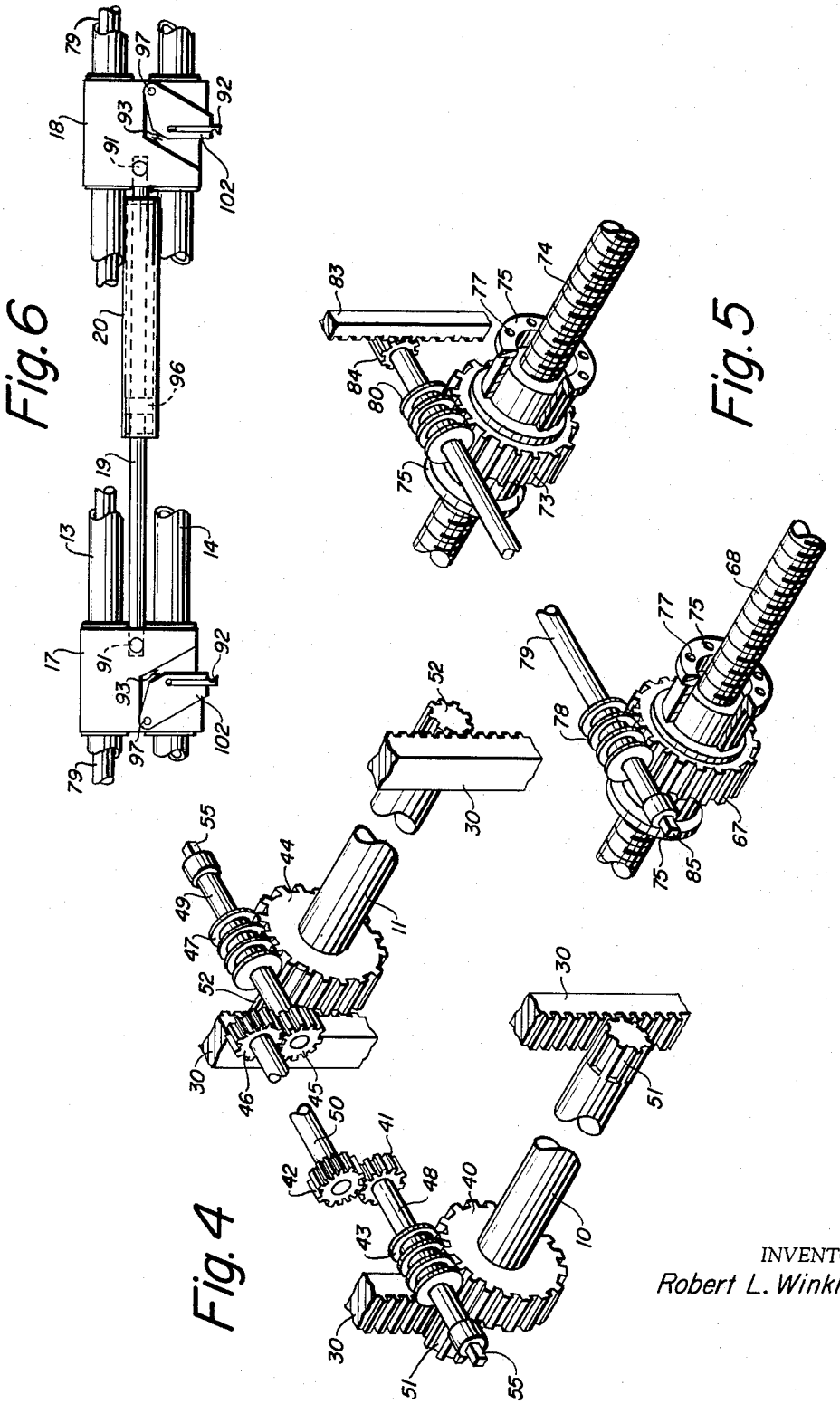

United States Patent Office 3,254,569
Patented June 7, 1966

3,254,569
PORTABLE SHAPER
Robert L. Winkler, Baltimore, Md., assignor, by mesne assignments, to Bethlehem Steel Corporation, a corporation of Delaware
Filed July 9, 1964, Ser. No. 381,454
8 Claims. (Cl. 90—38)

This invention relates generally to a shaper and in particular to a portable double acting shaper adapted to efficiently and accurately perform a cutting operation.

Under some circumstances it is desirable to utilize a portable shaper which is attached to the workpiece to be machined, e.g. when the size, location or complexity of disassembly of the workpiece makes it physically or economically infeasible to move the workpiece to the shaper. A portable shaper should be capable of an accurate and efficient cutting operation. The accuracy of a shaper depends in part on rigidity while the efficiency involves the ability to remove a large portion of metal in a minimum of time.

This invention provides an accurate and efficient portable shaper having a structural arrangement which provides the required rigidity necessary for high cutting forces. The structural arrangement comprises a frame detachably secured to the workpiece, a carriage slidably mounted on the frame and a tool holder slidably mounted on the carriage.

An object of this invention is to provide a portable shaper possessing the necessary rigidity to efficiently and accurately perform a cutting operation.

Another object of the invention is to so arrange the various members of a portable shaper such that the cutting forces are effectively transmitted to the workpiece to be machined.

FIG. 4 is a schematic perspective view showing the gearing arrangement for moving the shaper with respect to the workpiece.

FIG. 5 is a schematic perspective view showing the gearing arrangement for moving the carriage of the shaper.

FIG. 6 is a side view, partly broken, showing the means to move the tool holders of the shaper.

Figure 1:
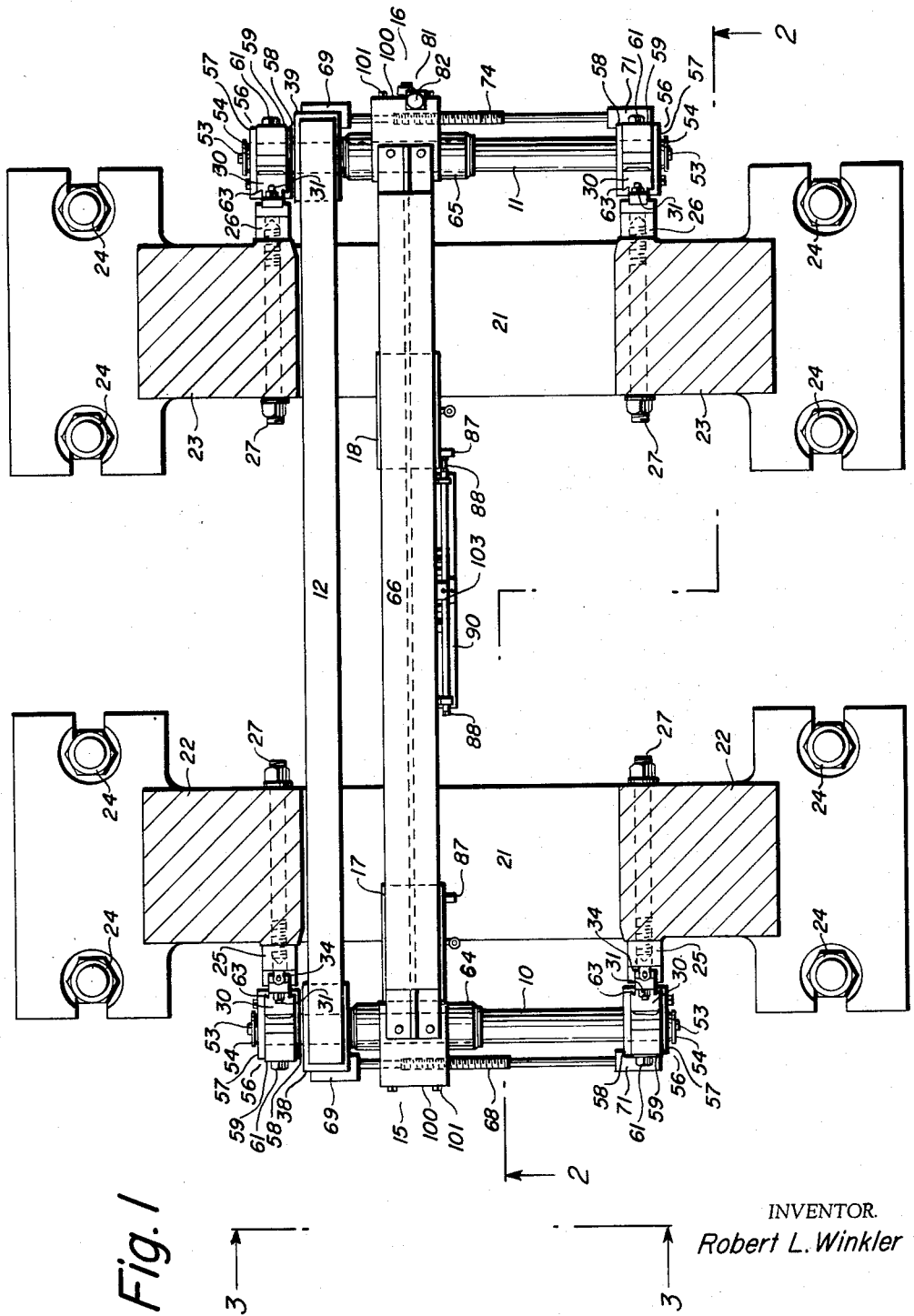
FIG. 1 is a plan view, partly in section, of the shaper attached to the workpiece to be machined.
Figure 2:
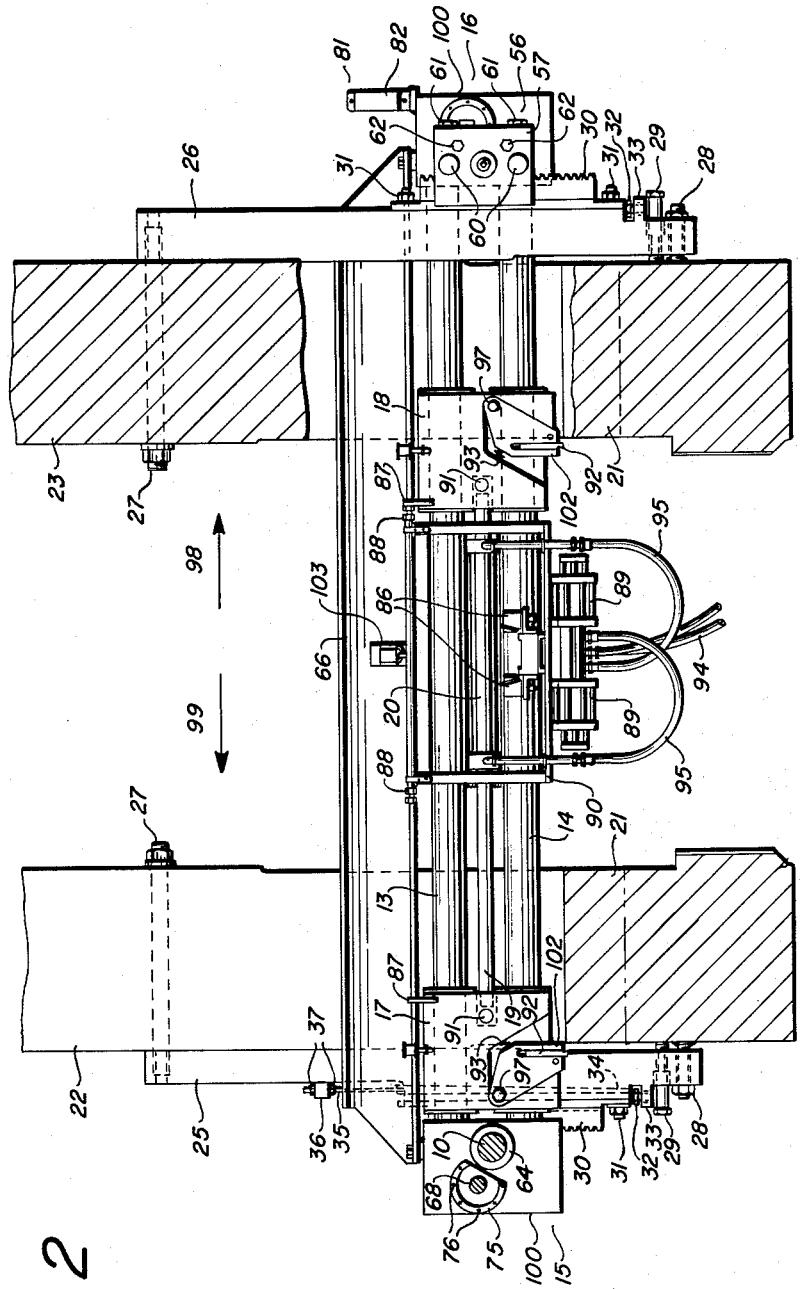
FIG. 2 is a sectional view, partly broken, along the lines 2—2 of FIG. 1.
Figure 3:
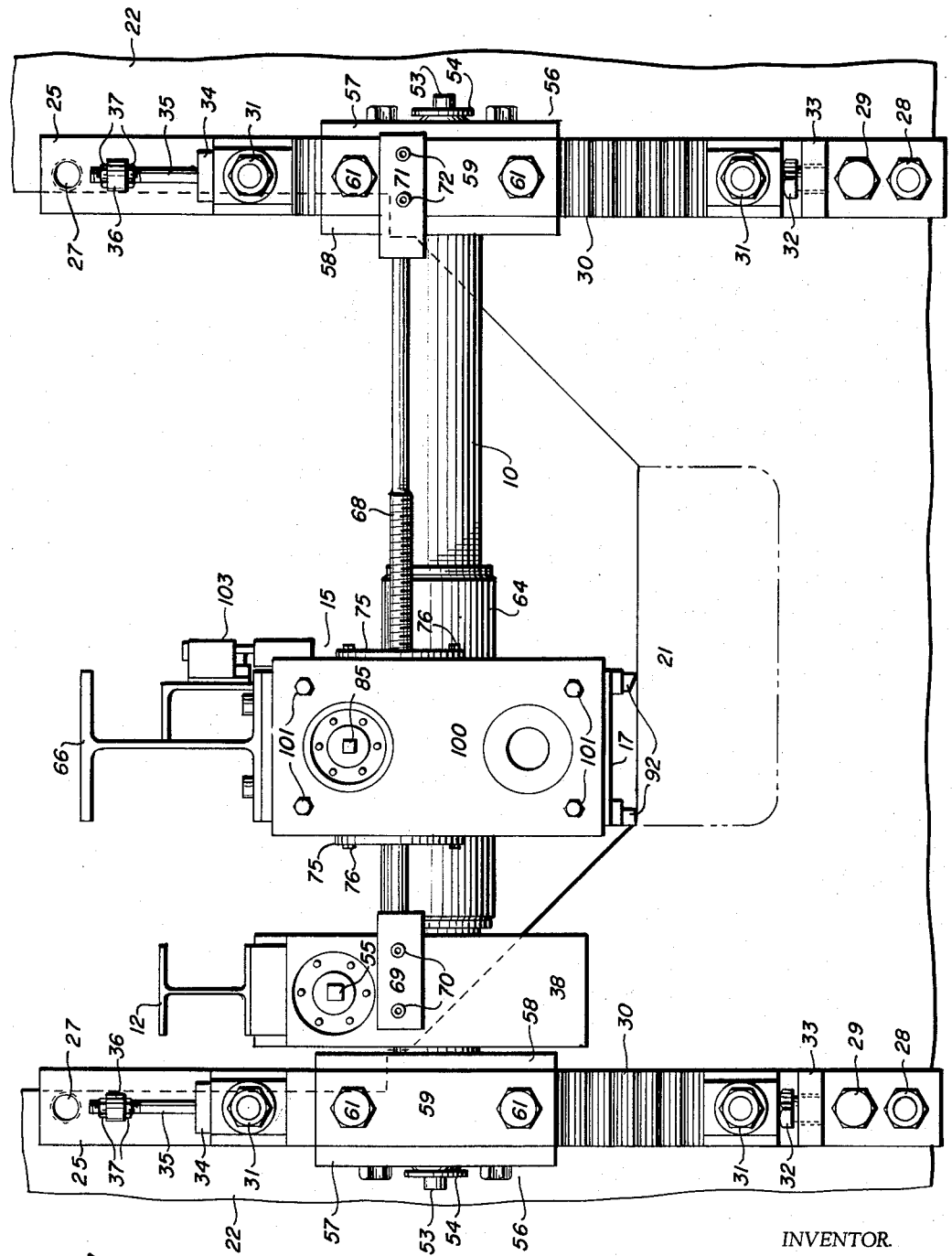
FIG. 3 is a view taken substantially along the lines 3—3 of FIG. 1.

As best shown in FIGS. 1, 2 and 3, the shaper comprises generally a frame which includes spaced parallel end rods 10, 11 connected by structural member 12, a carriage including parallel slide rods 13, 14 terminating in saddle members 15, 16 slidably mounted on end rods 10, 11 respectively, and tool holders 17, 18 slidably mounted on slide rods 13, 14 and attached to the ends of piston rod 19 of double acting hydraulic cylinder 20. By way of example the shaper is shown in position to machine portion 21 (FIG. 3) located at the bottom of each upright member 22, 23 of a rolling mill housing. It may be desirable to remove portion 21 in order to allow roll load detection apparatus to be installed therein. Each upright member 22, 23 is of considerable size and firmly anchored by bolts 24 as shown in FIG. 1. In the drawings the upper portion of the upright members 22, 23 has been removed. In FIG. 2 a portion of upright member 23 has been broken away to more clearly show the details of the shaper.

To secure the shaper to the workpiece two brackets, each designated as 25, are attached to upright member 22 and two brackets, each designated as 26, are attached to upright member 23. The brackets 25, 26 are attached to the upright members by means of bolts 27 passing through a hole in the upright members 22, 23 and in threaded engagement with the upper end of each bracket. The lower end of each bracket 25, 26 is held in place by a stud 28 welded to the upright member, passing through the bracket and having a nut on its outer end. In order to adjust the position of bracket 25 or 26 away from or toward its upright member 22 or 23 an adjusting bolt 29 passes through the lower end of each bracket in threaded engagement therewith and bears upon the upright member. The upper end of each bracket 25 and 26 may be correspondingly adjusted by means of shims or other suitable means, not shown.

A rack 30 is secured to each bracket 25, 26 by means of bolts 31 passing through vertically elongated holes adjacent the upper and lower end of the rack 30 and in threaded engagement with the bracket. A bolt 32 in threaded engagement with an integral ear 33 on each bracket bears upon the lower end of the rack 30 and by adjusting the position of bolt 32 the rack 30 may be moved along the bracket. In order to move the rack 30 away from or towards the bracket, a wedge 34 (FIG. 2) is positioned between the rack 30 and bracket 25. The upper end of the wedge 34 is attached to a stud 35 which extends upwardly and through a hole in a projecting portion 36 integral with the bracket 25. Nuts 37 are in threaded engagement with stud 35 on both sides of projecting portion 36. By loosening one nut 37 and tightening the other the wedge 34 is moved along the bracket 25 and in so doing the rack 30 is moved towards or away from the bracket 25. As shown in the drawings a wedge 34 is used only in conjunction with the two racks 30 and brackets 25 attached to upright member 22. However the wedge 34 could be used on all four racks 30. It should be understood that the above adjustment of the rack 30 and bracket 25 takes place during the initial stages of attaching the shaper to the workpiece and is used to insure a proper alignment of the shaper with respect to the workpiece.

The frame

The frame includes two end rods 10 and 11 spaced from and extending parallel to each other. Near one end of each end rod 10, 11 is a gear box 38, 39 respectively (FIG. 1). Each gear box encircles its end rod while permitting the end rod to rotate therein. Structural member 12 is attached to the top of each gear box and connects parallel end rods 10, 11 to each other. With reference to FIG. 4, the gear box 38 (not shown) encloses gears 40, 41 and 42 and worm gear 43. Gear box 39 (not shown) encloses gears 44, 45, 46 and worm gear 47. Gear 40 is attached to end rod 10, gear 44 to end rod 11, worm gear 43 and gear 41 to shaft 48, worm gear 47 and gear 45 to shaft 49 and gears 42 and 46 to shaft 50. Shaft 50 connects the gearing arrangement of the end rods 10, 11 to each other and extends below and parallel to structural member 12. Secured adjacent the ends of end rods 10 and 11 are pinions 51 and 52 respectively which are in engagement with their respective rack 30. Each pinion 51, 52 is integral with its end rod and retainer 54 and bolt 53 in threaded engagement with the end rod retain housing member 56 thereon (FIGS. 1 and 2). The rotation of either shaft 48 or 49 by means of wrench fitting 55 which extends beyond its respective gear box 38 or 39 will cause both end rods 10, 11 to rotate simultaneously. The rotation of end rods 10, 11 causes pinions 51, 52 to move along their respective rack 30 and move the frame with respect to upright members 22, 23. For example, rotation of shaft 48 produces the rotation of worm gear 43, gear 40, end rod 10 and pinions 51. In addition, this rotation is passed on to pinions 52, of end rod 11 by means of gears 41, 42, shaft 50, gears 46, 45, shaft 49, worm gear 47 and gear 44.

In order to maintain proper contact between the pinions 51, 52 of end rods 10 and 11 and rack 30 each pinion is enclosed in a housing member 56. See FIGS. 1, 2 and 3. Since each member 56 of the pinions 51, 52 is substantially the same, the description of one such member 56 will suffice. Member 56 comprises two side portions 57 and 58, and a front portion 59. Side portion 58 encircles the end rod while side portion 57 has an opening therein for bolt 53. In order to properly align side portions 57 and 58 and front portion 59 with themselves and the end rod and to provide means to clamp the end rods 10, 11 and their respective pinions 51, 52 in a given position with respect to rack 30, stud bolts 60 (FIG. 2) extend through the side portions 57, 58 and are in threaded engagement with bolts 61 extending through front portion 59. Bolts 62 extend through side portion 57 and are in threaded engagement with side portion 58. As best shown in FIG. 1 side portions 57 and 58 are in sliding engagement with the rack 30 by means of an integral V-shaped portion mating with a V-shaped slot 63 in the side of the rack 30 facing the bracket 25 or 26. This sliding engagement is established by a proper tightening of bolts 61 and 62. Upon a further tightening of bolts 61 the integral V-shaped portion of side portions 57 and 58 are brought into fixed engagement with the V-shaped slot 63 in rack 30 and the shaper frame is clamped in a given position with respect to the rack.

The carriage

The carriage comprises parallel slide rods 13 and 14 (FIG. 2) terminating in saddle members 15 and 16. Saddle member 15 by means of integral tubular portion 64 (FIGS. 1 and 3) is slidably mounted on end rod 10 and saddle member 16 by means of integral portion 65 is slidably mounted on end rod 11. Attached to the top of each saddle member is a structural member 66 which adds rigidity to the carriage. Each saddle member includes an end plate portion 100 held in place by bolts 101.

With particular reference to FIGS. 1, 2, 3 and 5 saddle member 15, encloses a gear 67 (FIG. 5) in threaded engagement with a stationary threaded rod 68 which has one end fixed to a bracket 69 attached to gear box 38 by bolts 70 and the other end fixed to a bracket 71 attached to the front portion 59 of member 56 by bolts 72 (FIG. 3). Saddle member 16 encloses a gear 73 (FIG. 5) in threaded engagement with stationary threaded rod 74 secured in a manner substantially the same as threaded rod 68. Retainers 75 (FIG. 5) are secured to the sides of the saddle member 15, 16 by means of bolts 76 (FIGS. 2 and 3) passing through holes 77 (FIG. 5) in retainers 75. Each retainer 75 encircles the hub of its gear 67 or 73 and a suitable bearing (not shown) allows the gear 67, 73 to rotate. This arrangement allows the saddle member 15, 16 to move along with its respective gear 67, 73 which moves in threaded engagement with stationary threaded rod 68, 74 respectively. Saddle member 15 also encloses worm gear 78 and part of shaft 79 which extends through slide rod 13 to the opposite saddle member 16 (FIG. 6) which in turn encloses a gear 73, worm gear 80, a part of shaft 79 and reciprocating rack 83 and gear 84 of automatic index means 81 (FIG. 2). Automatic index means 81 comprises an air cylinder 82 having its piston rod connected to reciprocating rack 83 (FIG. 5) in engagement with gear 84 attached to shaft 79. Gear 84 is attached to shaft 79 by means of any suitable ratchet arrangement (not shown) such that rotation of gear 84 in one direction causes a rotation of shaft 79 while rotation in the opposite direction does not produce a rotation of shaft 79.

It can readily be seen by FIG. 5 that a rotation of shaft 79 by the rack 83 and mating gear 84 or by means of a wrench fitting 85 which extends through saddle member 15 (FIG. 3) produces by means of worm gears 78 and 80 a rotation of gears 67 and 73. This rotation causes gears 67 and 73 to move along their respective stationary threaded rods 68 and 74 and thus drive the saddle members 15, 16 along their respective end rods 10, 11 to index the carriage.

The automatic index means 81 is actuated by means of a solenoid valve 86 attached to bracket 90 (FIG. 2). Solenoid valve 86 is actuated by the fixed stops 87 of tool holders 17, 18 contacting the adjustable stops 88 of limit switch 103 attached to structural member 66. Limit switch 103 is connected to solenoid valve 86 which is connected to the air cylinder 82 of automatic index means 81 in the usual manner well known in the art.

The tool holders

Two tool holders 17, 18 are slidably mounted on and encircle slide rods 13, 14 (FIG. 2). Hydraulic cylinder 20 and valves 89 are mounted on a bracket 90 which is attached to structural member 66 and slide rods 13, 14. As best shown in FIGS. 2 and 6 hydraulic cylinder 20 is located at the approximate midpoint of and between slide rods 13, 14. The piston rod 19 of double acting hydraulic cylinder 20 extends on both sides of the cylinder 20 and is connected to each tool holder 17, 18 by means of a pin 91.

Each tool holder 17, 18 includes a conventional clapper box 102 (FIG. 2) on each side of the tool holder (FIG. 3) with a tool 92 secured therein. The clapper box is pivoted to fastener 97 and a spring 93 urges the clapper box in one direction. This arrangement allows the tools of only one tool holder to cut as the piston 96 (FIG. 6) moves from one end of the hydraulic cylinder 20 to the other end.

The hydraulic valves 89 attached to bracket 90 are suitably connected to a hydraulic supply by means of flexible hoses 94 and to each end of the hydraulic cylinder 20 by means of hoses 95 (FIG. 2).

Solenoid valve 86 which is used to actuate automatic index means 81 as described above is also used to actuate hydraulic valves 89. In operation as fixed stop 87 of either tool holder 17 or 18 contacts its adjustable stop 88 of limit switch 103, solenoid valve 86 actuates hydraulic valves 89 which reverses the flow of hydraulic fluid and causes the tool holders 17, 18 to move in the opposite direction. Subsequently the fixed stop 87 of the opposite tool holder contacts its adjustable stop 88 of limit switch 103. Thereupon solenoid valve 86 again actuates hydraulic valve 89 to reverse the direction of motion of the tool holders 17, 18. Solenoid valve 86 is connected to hydraulic valves 89 in the usual manner well known in the art.

While the arrangement is shown and described as a hydraulic unit other suitable means could be utilized to obtain the reciprocating motion of tool holders 17, 18 along the slide rods 13, 14.

It should be understood that suitable lubrication is provided where required. Furthermore the showing and description of the shaper with respect to a rolling mill housing is illustrative only and the shaper can be used in machining other workpieces.

The cutting operation

After the pinions 51 and 52 of end rods 10, 11 respectively have been properly positioned on the racks 30 attached to brackets 25, 26 as described above, the frame of the shaper is moved to properly vertically position the tools 92 by means of the gearing arrangement of FIG. 4. Once the frame is at the desired location bolts 61 of front portion 59 of each housing member 56 are tightened to clamp the frame at that location.

Having properly vertically located the frame, the carriage is indexed horizontally to its desired position by means of the gearing arrangement of FIG. 5 which moves saddle members 15 and 16 along their respective end rods 10 and 11. This initial setting of the carriage position is obtained by turning shaft 79 by means of wrench fitting 85.

It is desirable that the location of the brackets 25 and 26 on upright members 22, 23 be such that when the frame and carriage are positioned as described above the length of rack 30 below its mating pinion 51 or 52 of end rods 10 and 11 is greater than the desired depth of cut. Also the length of threaded rod 68 or 74 extending on one side of its respective gear 67 or 73 should be sufficient to obtain the desired width of cut. This is required because for a fixed bracket 25 and 26 location the depth of cut is limited by the extent of movement of the pinion 51, 52 on its rack 30 and the extent the tools can be indexed is limited by the movement of gears 67 and 73 along their respective threaded rods 68 and 74. Of course a plurality of bracket 25 and 26 locations on the upright members 22, 23 could be established and thereby the depth and width of cut correspondingly increased.

In positioning the frame and carriage as described above the piston 96 of hydraulic cylinder 20 should be located at one end of the cylinder 20 in order to allow the piston rod 19 to extend a maximum length on one side of cylinder 20. As shown in FIG. 2 this allows both tool holders 17, 18 to have their tools 92 out of contact with the workpiece.

After properly positioning the frame, carriage and tool holders with respect to the workpiece, hydraulic pressure is supplied by hoses 94 to hydraulic valves 89 which in turn through one of the hoses 95 transmits the pressure to one end of the hydraulic cylinder 20. This causes the piston 96 to move towards the other end of hydraulic cylinder 20 and thereby slide tool holders 17, 18 connected to piston rod 19 along slide rods 13 and 14. As the tool holders 17, 18 slide in the direction of arrow 98 (FIG. 2) the tools 92 of tool holder 17 effect a cutting stroke while the tools 92 of tool holder 18 due to the pivoting of the clapper box about fastener 97 do not effect a cutting stroke. The tool holders 17, 18 continue to slide along slide rods 13 and 14 in the direction of arrow 98 until the tools 92 of tool holder 17 finish their cutting stroke and fixed stop 87 of tool holder 17 contacts its adjustable stop 88 of limit switch 103. Whereupon solenoid valve 86 actuates the air cylinder 82 of automatic index means 81 which produces a reciprocating movement of rack 83 (FIG. 5), a rotation of gear 84, shaft 79, worm gears 78 and 80, and gears 67 and 73. This rotation causes gears 67 and 73 to move along their respective threaded rods 68 and 74 and thereby index the carriage member along the width of the cut. The distance the carriage is indexed depends upon the stroke of air cylinder 82 which controls the movement of rack 83. Solenoid valve 86 also actuates hydraulic valves 89 which causes hydraulic pressure to be exerted on the other side of piston 96 and thereby cause the tool holders to move in a direction indicated by arrow 99 (FIG. 2). As the tool holders 17, 18 move in the direction of arrow 99 the tools 92 of tool holder 18 effect a cutting stroke while the tools 92 of tool holder 17 do not effect a cutting stroke. The tool holders 17, 18 will continue to move in the direction of arrow 99 until the tools 92 of tool holder 18 complete their cutting stroke and the fixed stop 87 of tool holder 18 contacts its adjustable stop 88 of limit switch 103. At this time the solenoid valve 86 again actuates the automatic index means 81 and hydraulic valves 89 and the carriage is indexed and the movement of the piston 96 is reversed.

The above sequence of cutting and indexing will continue until the desired width of cut is produced whereupon the tool holders will be stopped with piston 96 at one end of hydraulic cylinder 20. At this time bolts 61 will be loosened to allow the frame to be lowered by means of the gearing arrangement of FIG. 4. After the frame has been lowered the proper distance for the depth of cut, bolts 61 are tightened and the above cutting and indexing sequence resumed.

It should be noted that the structural arrangement of the shaper provides for the high cutting forces to be transmitted by a tensile force in the piston rod 19 and slide rods 13, 14 to the saddle members 15, 16. The saddle members 15, 16 in turn act on the end rods 10, 11 which act as a beam across the opening in their respective upright members 22, 23. The resultant of the high cutting force is a compressive force acting on the outside face of upright members 22, 23. Thus the required rigidity is provided by the workpiece to be machined.

As described above both tools 92 of both tool holders 17, 18 are used to produce a cutting stroke. It would be obvious that one or more of the tools 92 could be removed. Furthermore it would be practical to provide more than two tools per holder or more than two tool holders.

While I have described my invention in considerable detail, I do not wish to be limited to the exact construction shown and described, but may use such substitutions, modifications or equivalents thereof as are embraced within the scope of my invention, or as pointed out in the appended claims.

I claim:
1. A portable shaper adapted to be detachably secured to a workpiece to be machined comprising:
   (a) a frame including two spaced end rods extending substantially parallel to each other,
   (b) a carriage mounted on said end rods including a slide rod extending between and substantially perpendicular to said end rods,
   (c) a tool holder mounted adjacent each end of said slide rod,
   (d) means to move said frame relative to said workpiece to control the depth of cut,
   (e) means to move said carriage along said end rods to index said carriage, and
   (f) means to move each tool holder along said slide rod to effect a cutting stroke.

2. A portable shaper adapted to be detachably secured to a workpiece to be machined comprising:
   (a) a frame including two spaced end rods extending substantially parallel to each other,
   (b) a pinion fixed to each end of each end rod and in engagement with a rack secured to said workpiece,
   (c) a carriage mounted on said end rods including a slide rod extending between and substantially perpendicular to said end rods,
   (d) a tool holder mounted adjacent each end of said slide rod,
   (e) means to rotate said end rods to move each pinion along said rack to control the depth of cut,
   (f) means to move said carriage along said end rods to index said carriage, and
   (g) means to move each tool holder along said slide rod to effect a cutting stroke.

3. A portable shaper adapted to be detachably secured to a workpiece to be machined comprising:
   (a) a frame including two spaced end rods extending substantially parallel to each other,
   (b) a pinion fixed to each end of each end rod and in engagement with a rack secured to said workpiece,
   (c) a carriage including a slide rod extending between and substantially perpendicular to said end rods,
   (d) a saddle member slidably mounted on each end rod and attached to said slide rod,
   (e) a tool holder slidably mounted adjacent each end of said slide rod,
   (f) means to rotate said end rods to move each pinion along said rack to control the depth of cut,
   (g) means to move the saddle members along said end rods to index said carriage, and
   (h) means to move each tool holder along said slide rod to effect a cutting stroke.

4. A portable shaper adapted to be detachably secured to a workpiece to be machined comprising:
   (a) a frame including two spaced end rods extending substantially parallel to each other, (b) a pinion fixed to each end of each end rod and in engagement with a rack secured to said workpiece,
(c) a carriage including a slide rod extending between and substantially perpendicular to said end rods,
(d) a saddle member slidably mounted on each end rod and attached to said slide rod,
(e) a tool holder slidably mounted adjacent each end of said slide rod,
(f) a double acting cylinder positioned near the longitudinal midpoint of said slide rod with its piston rod attached to each tool holder,
(g) means to simultaneously rotate said end rods to move each pinion along said rack to control the depth of cut,
(h) means to simultaneously move the saddle members along said end rods to index said carriage, and
(i) means to actuate said cylinder to simultaneously move the tool holders along said slide rod to effect a cutting stroke.

5. A portable shaper adapted to be detachably secured to a workpiece to be machined comprising:
(a) a frame including two spaced end rods extending substantially parallel to each other,
(b) a pinion fixed to each end of each end rod and in engagement with a rack secured to said workpiece,
(c) a carriage including two parallel slide rods extending between and substantially perpendicular to said end rods,
(d) a saddle member slidably mounted on each end rod and attached to said slide rods,
(e) a tool holder slidably mounted adjacent the ends of said slide rods,
(f) a double acting cylinder positioned near the longitudinal midpoint of said slide rods with its piston rod attached to each tool holder,
(g) means to simultaneously rotate said end rods to move each pinion along said rack to control the depth of cut,
(h) means to simultaneously move the saddle member along said end rods to index said carriage, and
(i) means to actuate said cylinder to simultaneously move the tool holders along said slide rods to effect a cutting stroke.

6. A portable shaper as described in claim 5 wherein the means of subparagraph (g) includes
a first gear fixed to one of said two end rods,
a second gear fixed to the other end rod,
first and second worm gears in engagement with said first and second gears respectively, and
gear and shaft means to rotatably connect said first and second worm gears.

7. A portable shaper as described in claim 5 wherein the means of subparagraph (h) includes
a first stationary threaded rod extending adjacent to and substantially parallel with one of said two end rods,
a second stationary threaded rod extending adjacent to and substantially parallel with the other end rod,
a first gear rotatably secured to one saddle member and in threaded engagement with said first rod,
a second gear rotatably secured to the other saddle member and in threaded engagement with said second rod,
first and second worm gears fixed to a common shaft and in engagement with said first and second gears respectively, and
means actuated by said tool holders to rotate said common shaft.

8. A portable shaper as described in claim 5 wherein the means of subparagraph (g) includes
a first gear fixed to one of said two end rods,
a second gear fixed to the other end rod,
first and second worm gears in engagement with said first and second gears respectively, and
gear and shaft means to rotatably connect said first and second worm gears,
and the means of subparagraph (h) includes
a first stationary threaded rod extending adjacent to and substantially parallel with one of said two end rods,
a second stationary threaded rod extending adjacent to and substantially parallel with the other end rod,
a first gear rotatably secured to one saddle member and in threaded engagement with said first rod,
a second gear rotatably secured to the other saddle member and in threaded engagement with said second rod,
first and second worm gears fixed to a common shaft and in engagement with said first and second gears respectively, and
means actuated by said tool holders to rotate said common shaft.

References Cited by the Examiner

UNITED STATES PATENTS

| | | | |
|---|---|---|---|
| 1,385,344 | 7/1921 | Mooney et al. | 90—38 |
| 2,321,441 | 6/1943 | Webber | 90—38 |

WILLIAM W. DYER, JR., *Primary Examiner.*

G. A. DOST, *Assistant Examiner.*